(12) United States Patent
Kobayashi et al.

(10) Patent No.: US 8,867,643 B2
(45) Date of Patent: Oct. 21, 2014

(54) TESTING APPARATUS AND METHOD FOR MIMO SYSTEMS

(71) Applicants: Takeshi Kobayashi, Atsugi (JP); Kazunori Kitagawa, Atsugi (JP); Masaki Hizume, Atsugi (JP)

(72) Inventors: Takeshi Kobayashi, Atsugi (JP); Kazunori Kitagawa, Atsugi (JP); Masaki Hizume, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 14/068,826

(22) Filed: Oct. 31, 2013

(65) Prior Publication Data

US 2014/0126618 A1 May 8, 2014

(30) Foreign Application Priority Data

Nov. 7, 2012 (JP) .................................. 2012-245082

(51) Int. Cl.
*H04L 27/28* (2006.01)
*H04B 17/00* (2006.01)
*H04B 7/04* (2006.01)

(52) U.S. Cl.
CPC ............ *H04B 17/009* (2013.01); *H04B 7/0456* (2013.01)
USPC .......................................... 375/260; 375/224

(58) Field of Classification Search
CPC .... H04B 7/0452; H04B 7/0456; H04L 27/28; H04L 27/30
USPC ................................................. 375/260, 224
See application file for complete search history.

(56) References Cited

U.S. PATENT DOCUMENTS

| | | | | |
|---|---|---|---|---|
| 8,457,231 | B2 * | 6/2013 | Zhu et al. ....................... | 375/267 |
| 2012/0128044 | A1 * | 5/2012 | Kim et al. ...................... | 375/219 |
| 2012/0219089 | A1 * | 8/2012 | Murakami et al. ............. | 375/296 |
| 2014/0119466 | A1 * | 5/2014 | Kim et al. ...................... | 375/267 |

FOREIGN PATENT DOCUMENTS

JP 2009-171502 7/2009

* cited by examiner

*Primary Examiner* — Kevin Kim
(74) *Attorney, Agent, or Firm* — Greer Burns & Crain Ltd.

(57) ABSTRACT

Four (=M) transmission information signals are output from transmission information generating unit to linear transform unit, where they are transformed into synthesis signals by linear transform expressed by multiplication by a 2×4 matrix having complex numbers as elements. Signal processors perform signal processing corresponding to the modulation technique of test target on synthesis signals. On the resultant signals, 2×2 channel processing unit performs 2×2 pseudo channel processing, thereby forming equivalent M×N channels. Parameter setting unit sets information necessary to acquire desired M×N channel characteristics as the synthesis characteristics of linear transform unit and N×N channel processing unit.

10 Claims, 9 Drawing Sheets

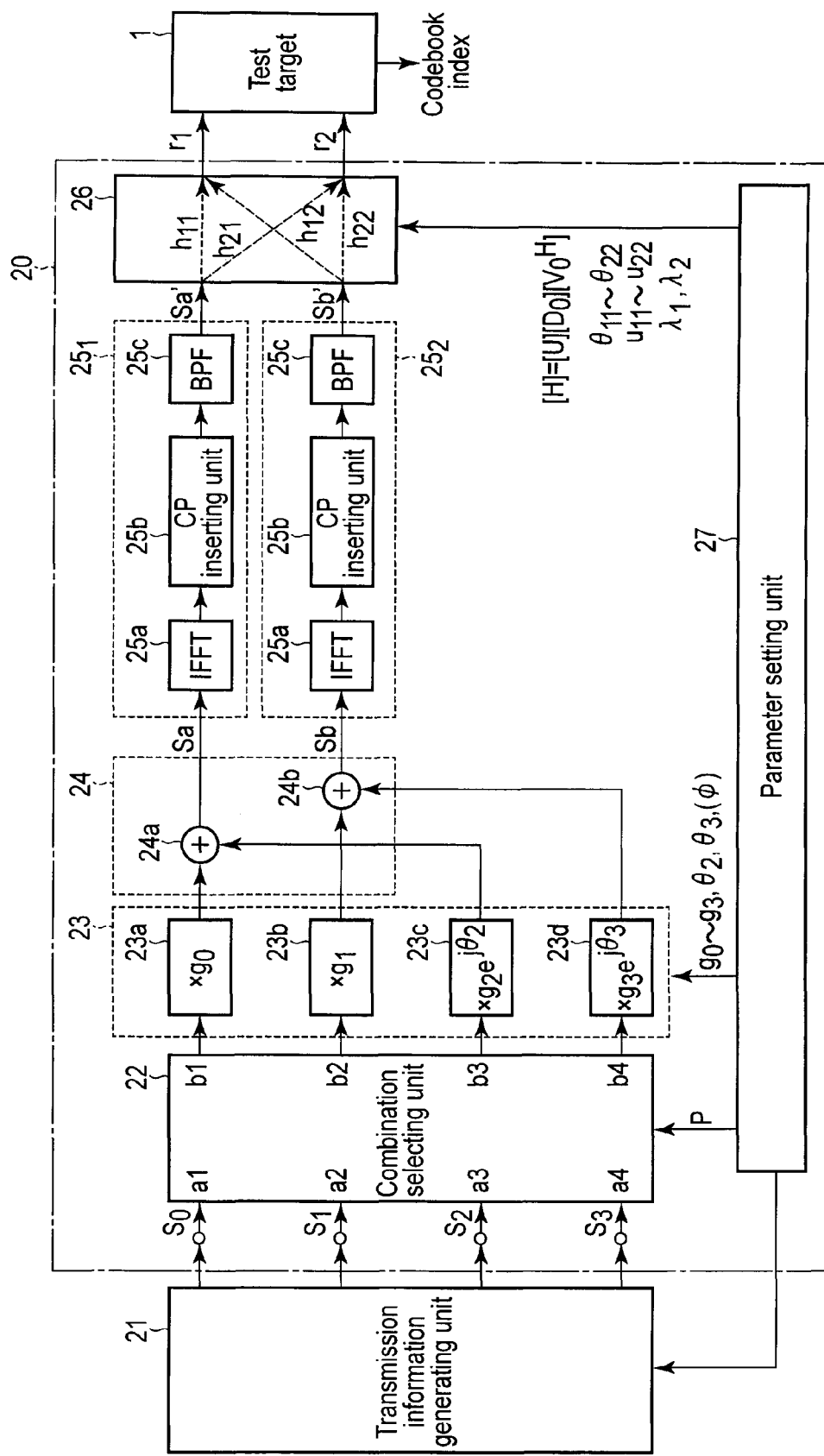
F I G. 1

| Codebook index | | Phase of Wi1 (degree) | Phase of Wi2 (degree) | Selection of matrix P | Setting for generating optimal precoding vector |
|---|---|---|---|---|---|
| 0 | i=1 | 0 | 0 | #3 | $\theta_{11}=0$, $\theta_{12}=0$ $\theta_{21}=0$, $\theta_{22}=180$ $\theta_2=0$, $\theta_3=0$ |
| | i=2 | 0 | 180 | | |
| | i=3 | 0 | 180 | | |
| | i=4 | 0 | 0 | | |
| 1 | i=1 | 0 | -90 | #2 | $\theta_{11}=0$, $\theta_{12}=-90$ $\theta_{21}=180$, $\theta_{22}=-90$ $\theta_1=-90$, $\theta_3=-90$ |
| | i=2 | 90 | 0 | | |
| | i=3 | 180 | -90 | | |
| | i=4 | -90 | 0 | | |
| 2 | i=1 | 0 | 180 | #2 | $\theta_{11}=0$, $\theta_{12}=180$ $\theta_{21}=0$, $\theta_{22}=0$ $\theta_1=-180$, $\theta_3=-180$ |
| | i=2 | 180 | 0 | | |
| | i=3 | 0 | 0 | | |
| | i=4 | 180 | 180 | | |
| 3 | i=1 | 0 | 90 | #2 | $\theta_{11}=0$, $\theta_{12}=90$ $\theta_{21}=180$, $\theta_{22}=90$ $\theta_2=90$, $\theta_3=90$ |
| | i=2 | -90 | 0 | | |
| | i=3 | 180 | 90 | | |
| | i=4 | 90 | 0 | | |
| 4 | i=1 | 0 | -135 | #3 | $\theta_{11}=0$, $\theta_{12}=-135$ $\theta_{21}=90$, $\theta_{22}=135$ $\theta_2=-135$, $\theta_3=45$ |
| | i=2 | 45 | 90 | | |
| | i=3 | 90 | 135 | | |
| | i=4 | 135 | 0 | | |
| 5 | i=1 | 0 | -45 | #3 | $\theta_{11}=0$, $\theta_{12}=-45$ $\theta_{21}=-90$, $\theta_{22}=45$ $\theta_2=-45$, $\theta_3=135$ |
| | i=2 | 135 | -90 | | |
| | i=3 | 90 | 45 | | |
| | i=4 | 45 | 0 | | |
| 6 | i=1 | 0 | -90 | #1 | $\theta_{11}=0$, $\theta_{12}=-90$ $\theta_{21}=-135$, $\theta_{22}=-45$ $\theta_1=-90$, $\theta_3=-90$ |
| | i=2 | -135 | -45 | | |
| | i=3 | 90 | 0 | | |
| | i=4 | -45 | 45 | | |
| 7 | i=1 | 0 | 90 | #1 | $\theta_{11}=0$, $\theta_{12}=90$ $\theta_{21}=-45$, $\theta_{22}=-135$ $\theta_2=90$, $\theta_3=90$ |
| | i=2 | -45 | -135 | | |
| | i=3 | -90 | 0 | | |
| | i=4 | -135 | 135 | | |

F I G. 4

| Codebook index | | Phase of Wi1 (degree) | Phase of Wi2 (degree) | Selection of matrix P | Setting for generating optimal precoding vector | |
|---|---|---|---|---|---|---|
| 8 | i=1 | 0 | 0 | #2 | $\theta_{11}=0$, | $\theta_{12}=0$ |
|  | i=2 | 0 | 0 |  | $\theta_{21}=180$, | $\theta_{22}=0$ |
|  | i=3 | 180 | 0 |  | $\theta_2=0$, | $\theta_3=0$ |
|  | i=4 | 180 | 0 |  |  |  |
| 9 | i=1 | 0 | -90 | #3 | $\theta_{11}=0$, | $\theta_{12}=-90$ |
|  | i=2 | 90 | 180 |  | $\theta_{21}=0$, | $\theta_{22}=90$ |
|  | i=3 | 0 | 90 |  | $\theta_2=-90$, | $\theta_3=-90$ |
|  | i=4 | 90 | 0 |  |  |  |
| 10 | i=1 | 0 | 180 | #1 | $\theta_{11}=0$, | $\theta_{12}=180$ |
|  | i=2 | 180 | 180 |  | $\theta_{21}=180$, | $\theta_{22}=180$ |
|  | i=3 | 180 | 0 |  | $\theta_2=180$, | $\theta_3=180$ |
|  | i=4 | 0 | 0 |  |  |  |
| 11 | i=1 | 0 | 0 | #1 | $\theta_{11}=0$, | $\theta_{12}=0$ |
|  | i=2 | -90 | 90 |  | $\theta_{21}=-90$, | $\theta_{22}=90$ |
|  | i=3 | 0 | 0 |  | $\theta_2=0$, | $\theta_3=0$ |
|  | i=4 | -90 | 90 |  |  |  |
| 12 | i=1 | 0 | 0 | #2 | $\theta_{11}=0$, | $\theta_{12}=0$ |
|  | i=2 | 0 | 0 |  | $\theta_{21}=0$, | $\theta_{22}=180$ |
|  | i=3 | 0 | 180 |  | $\theta_2=0$, | $\theta_3=-180$ |
|  | i=4 | 180 | 0 |  |  |  |
| 13 | i=1 | 0 | 180 | #1 | $\theta_{11}=0$, | $\theta_{12}=180$ |
|  | i=2 | 0 | 0 |  | $\theta_{21}=-0$, | $\theta_{22}=0$ |
|  | i=3 | 180 | 0 |  | $\theta_2=-180$, | $\theta_3=0$ |
|  | i=4 | 0 | 0 |  |  |  |
| 14 | i=1 | 0 | 0 | #1 | $\theta_{11}=0$, | $\theta_{12}=0$ |
|  | i=2 | 180 | 0 |  | $\theta_{21}=180$, | $\theta_{22}=0$ |
|  | i=3 | 0 | 0 |  | $\theta_2=0$, | $\theta_3=-180$ |
|  | i=4 | 0 | 180 |  |  |  |
| 15 | i=1 | 0 | 180 | #2 | $\theta_{11}=0$, | $\theta_{12}=180$ |
|  | i=2 | 180 | 0 |  | $\theta_{21}=180$, | $\theta_{22}=180$ |
|  | i=3 | 180 | 180 |  | $\theta_2=-180$, | $\theta_3=0$ |
|  | i=4 | 180 | 180 |  |  |  |

FIG. 5

| Designated value k | Index value determined optimal for change in $\phi$ on receiver side | | | | | | |
|---|---|---|---|---|---|---|---|
| | -180~ -135 | -135~ -90 | -90~ -45 | -45~ +45 | +45~ +90 | +90~ +135 | +135~ +180 |
| 0 | 2 | 11 | 11 | 0 | 9 | 9 | 2 |
| 1 | 3 | 8 | 8 | 1 | 10 | 10 | 3 |
| 2 | 0 | 9 | 9 | 2 | 11 | 11 | 0 |
| 3 | 1 | 10 | 10 | 3 | 8 | 8 | 1 |
| 4 | 6 | 6 | 4 | 4 | 4 | 6 | 6 |
| 5 | 7 | 7 | 5 | 5 | 5 | 7 | 7 |
| 6 | 4 | 4 | 6 | 6 | 6 | 4 | 4 |
| 7 | 5 | 5 | 7 | 7 | 7 | 5 | 5 |
| 8 | 10 | 3 | 3 | 8 | 1 | 1 | 10 |
| 9 | 11 | 0 | 0 | 9 | 2 | 2 | 11 |
| 10 | 8 | 1 | 1 | 10 | 3 | 3 | 8 |
| 11 | 9 | 2 | 2 | 11 | 0 | 0 | 9 |
| 12 | 14 | 14 | 12 | 12 | 12 | 14 | 14 |
| 13 | 15 | 15 | 13 | 13 | 13 | 15 | 15 |
| 14 | 12 | 12 | 14 | 14 | 14 | 12 | 12 |
| 15 | 13 | 13 | 15 | 15 | 15 | 13 | 13 |

FIG. 7

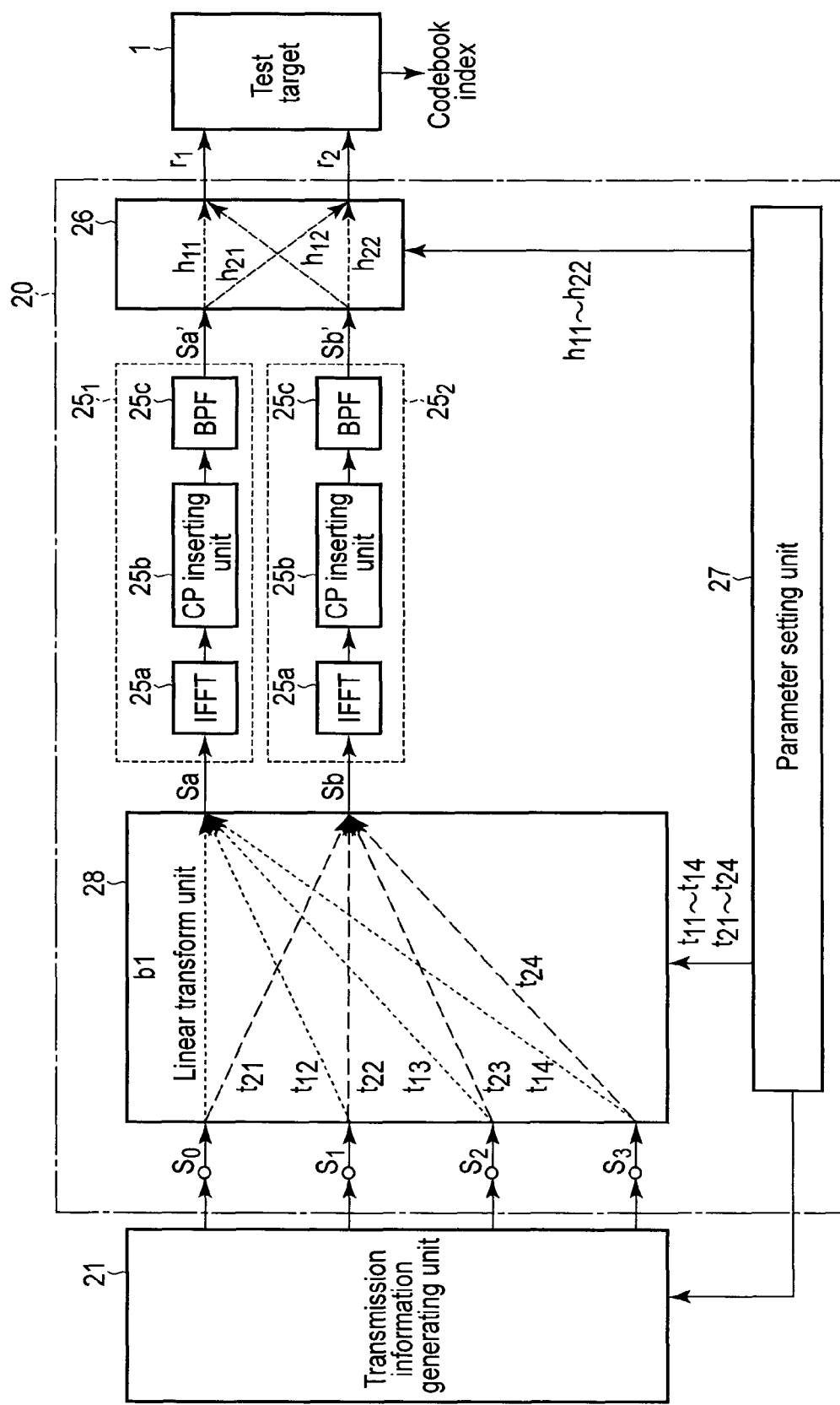
F I G. 8

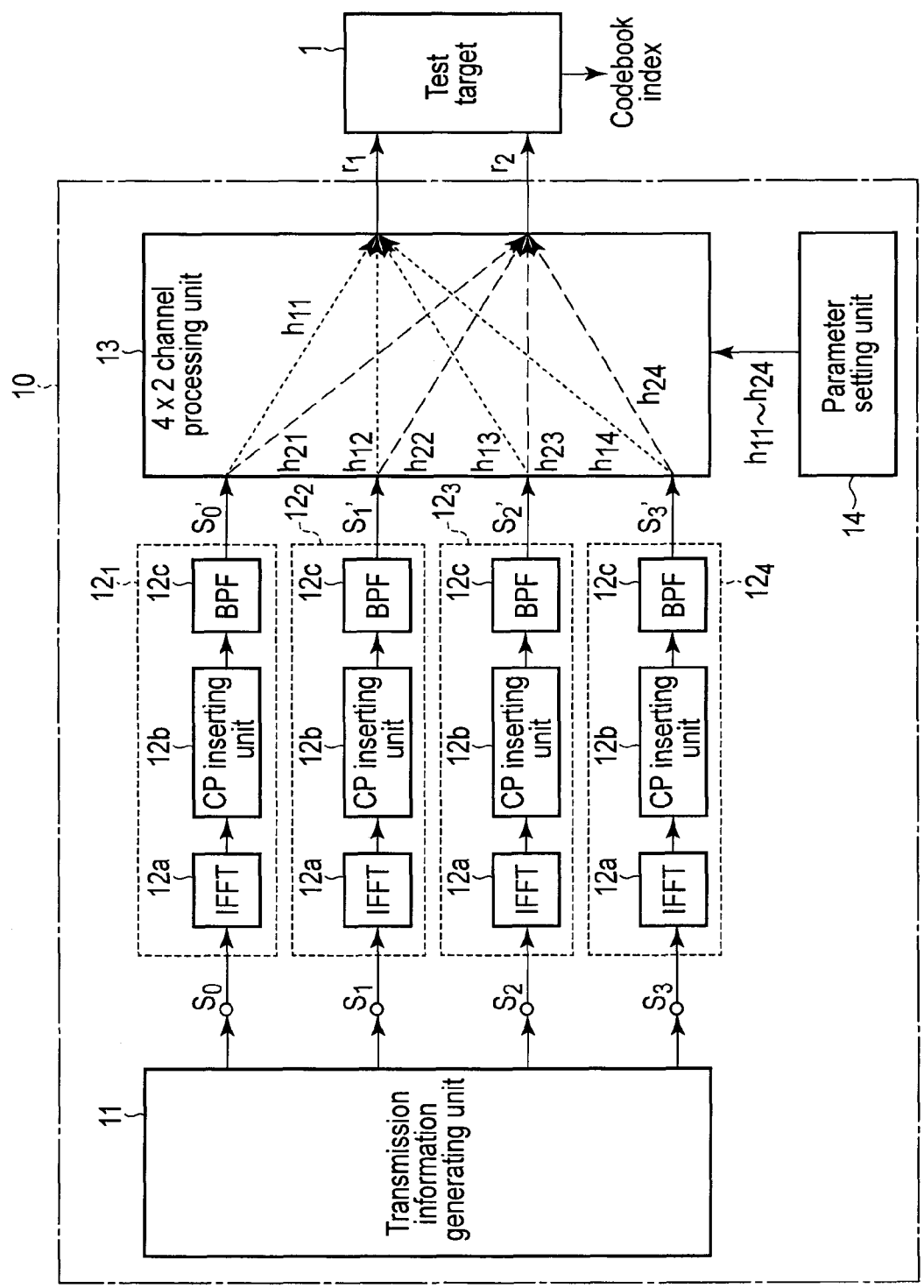
F I G. 9

TESTING APPARATUS AND METHOD FOR MIMO SYSTEMS

CROSS-REFERENCE TO RELATED APPLICATIONS

This application is based upon and claims the benefit of priority from prior Japanese Patent Application No. 2012-245082, filed Nov. 7, 2012, the entire contents of which are incorporated herein by reference.

BACKGROUND OF THE INVENTION

1. Field of the Invention

The present invention relates to a testing apparatus and method for MIMO systems. In particular, the invention relates to a testing apparatus and method for M×N MIMO (Multiple Input Multiple Output) systems that generate signals equivalent to those transmitted through M×N propagation channels and apply the generated signals to a mobile terminal as a test target, such as a mobile phone utilizing the MIMO scheme, or a circuit board contained therein, or an integrated circuit mounted on the board, in order to check them. More specifically, the invention relates to a testing apparatus and method for MIMO systems, in which while the M×N MIMO scheme is maintained theoretically, a technique for reducing the circuit scale of a signal processing circuit indispensable to the modulation technique of the test target is applied.

2. Description of the Related Art

In mobile terminals such as mobile phones and smartphones, there is a demand for high-speed communication of a large amount of information such as image information. To meet this demand, the MIMO scheme is utilized as a scheme of communication between base stations and mobile terminals.

The MIMO scheme is known as a scheme for simultaneously transmitting, from the base station side through M antennas, L sequences of data (L is a number of sequences of data called a layer number) as a transmission signal modulated by a predetermined modulation technique (e.g., OFDM, OFDMA or WCDMA), and receiving the transmission signal at the mobile terminal side through N antennas to thereby separate (demodulate) L sequences of data from the transmission signal.

In the MIMO scheme, transmission data rate of L (L is at most value of min {M, N}) times the transmission data rate of a standard 1×1 communication scheme can be realized, wherein "min {M, N}" indicates one of the M and N, the one of the M and N being lower than the other of the M and N, and L can at most be the lower number of them.

In the MIMO scheme, the M antennas of the base station are each connected to the N antennas of the mobile terminal by the M×N propagation channels. The state of each propagation channel differs depending upon, for example, the locations between the base station and the mobile terminal, and their attitudes. In accordance with the state of each propagation channel, the signals received through the N antennas vary.

In the MIMO scheme, in order to correctly separate L sequences of data from N received signals that vary in level in accordance with the states of the propagation channels, the states of the propagation channels are estimated by transmitting already known signals (pilot signals) from the base station side, and performing a particular calculation using the known signals and the signals actually received at the mobile terminal side. Further, data that enables the transmitter side to perform information transmission of highest quality in the estimated channel states is determined and sent to the base station side.

The data used for signal processing at the transmitter side is called a precoding vector. In the MIMO scheme using codebook based precoding, a set of precoding vectors assumed to be used for the M×N propagation channels is beforehand prepared at the base station side, and transmission information is processed using the precoding vector reported from the mobile terminal side, thereby improving the quality (e.g., signal intensity) of the signal received at the receiver side (mobile terminal).

In view of this, in a test method for a test target, such as a mobile terminal utilizing the M×N MIMO scheme, a circuit board incorporated therein, or an integrated circuit mounted on the board, it is necessary to determine whether the test target selects an appropriate precoding vector corresponding to the characteristics of M×N propagation channels, when reference signals are applied to the M×N propagation channels whose characteristics are already known, and their outputs are applied to the test target.

As an apparatus used for the above-mentioned test, a terminal testing apparatus 10 having the configuration shown in FIG. 9 can be supposed.

The terminal testing apparatus 10 conforms to a MIMO scheme of M=4 and N=2, and a transmission information generating unit 11 incorporated therein generates and outputs four (=M) transmission information signals s0-s3. The transmission information signal is a source signal unique to the modulation technique. For instance, in the case of the OFDMA modulation used in LTE or the OFDM modulation technique used in wireless LAN, the transmission information signal is symbol data for each subcarrier. The transmission information generating unit 11 directly outputs the symbol data, or processes the symbol data using one of the precoding vectors prestored in a codebook (not shown) and outputs the resultant data.

The four transmission information signals s0-s3 are input to signal processing units $12_1$-$12_4$, respectively, where they are subjected to signal processing unique to the modulation technique. For instance, if the modulation technique is the aforementioned OFDM, transmission information signals s0-s3 corresponding to subcarriers (in the frequency domain) are transformed into signals in the time domain by an inverse Fourier transformer (IFFT) 12a. The resultant signals are sent to a CP (cyclic prefix) inserting unit 12b, where the copy of a part of its own signal is inserted into the signals. The outputs signals of the inserting unit 12b are sent to a bandpass filter (BPF) 12c, where the signals are transformed into OFDM modulation signals s0' to s3' by band limitation processing. Also in other modulation techniques, signal processing corresponding thereto is required to be performed on each signal sequence.

These four modulated signals s0' to s3' are sent to a 4×2 channel processing unit 13, in which eight pseudo propagation channels that connect the four input ports to the two output ports are defined, and propagation channel information items h11-h24 indicating the characteristics of the pseudo propagation channels are defined. The propagation channel information items are defined by a parameter setting unit 14.

The 4×2 channel processing unit 13 outputs, through one of the two output ports, a signal r1 obtained by multiplying the input signals s0' to s3' by the four propagation channel information items h11-h14 concerning the four propagation channels connected to the one output port. Similarly, the 4×2 channel processing unit 13 outputs, through the other output port, a signal r2 obtained by multiplying the input signals s0' to s3' by the four propagation channel information items h21-h24 concerning the four propagation channels connected to the other output port. These two signals r1 and r2 are applied to a test target 1.

Namely, the signals r1 and r2 are expressed as follows:

$r1 = h11 \cdot s0' + h12 \cdot s1' + h13 \cdot s2' + h14 \cdot s3'$ $r2 = h21 \cdot s0' + h22 \cdot s1' + h23 \cdot s2' + h24 \cdot s3'$ The test target 1 has a function of measuring propagation channel characteristics based on the input signals r1 and r2, selecting an appropriate precoding vector corresponding to the measured characteristics, and outputting and reporting a codebook index value corresponding to the precoding vector. Accordingly, it is regarded as one of the operation confirmations of the test target 1 in the testing method to check whether the test target 1 selects an appropriate precoding vector for a target propagation channel whose characteristics are already known.

Jpn. Pat. Appln. KOKAI Publication No. 2009-171502, for example, discloses a technique of testing a mobile terminal utilizing the MIMO scheme.

To form propagation channels of the 4×2 MIMO scheme, the testing apparatus disclosed in the above publication needs logical circuit resources corresponding to four transmission antennas, more specifically, needs four signal processing units 121 to 124 that perform signal processing unique to the modulation technique on the four information signals output from the transmission information generating unit 11. In the apparatuses demanded to be reduced in cost, the cost required for the four signal processing units 121 to 124 cannot be ignored.

Further, it is difficult to modify existing testing apparatuses that have a testing function corresponding to the 2×2 MIMO scheme, so as to conform to, for example, the 4×2 MIMO scheme in which a greater number of transmission antennas are used.

BRIEF SUMMARY OF THE INVENTION

It is an object of the invention to provide a testing apparatus, which overcomes the above-mentioned problems to thereby realize testing of M×N MIMO systems with a low cost structure, and can be easily changed to deal with systems with a larger number of transmission antennas.

To attain the object, claim 1 provides a test apparatus for testing a test target that includes a terminal, a circuit board incorporated in the terminal, or an integrated circuit mounted on the circuit board, the terminal utilizing an M×N (M>N) MIMO scheme in which M antennas are provided on a base station side, and N antennas are provided on a terminal side, the test apparatus including a transmission information generating unit (21) configured to output transmission information of M series signals to be sent to the test target.

The test apparatus comprises:

a linear transform unit (28) configured to receive the transmission information of M series signals and designated parameter information, and to transform the received transmission information of M series signals into N synthesis signals by linear transform expressed by multiplication by a matrix of N rows and M columns that includes complex numbers as elements;

N signal processing units (25) configured to perform, on the N synthesis signals, signal processing corresponding to a modulation technique of the test target;

an N×N propagation channel processing unit (26) configured to perform N×N pseudo propagation channel processing on N signals output from the N signal processing units, based on designated propagation channel information, and to supply resultant N signals to the test target; and a parameter setting unit (27) configured to set information in the linear transform unit and the N×N propagation channel processing unit to acquire desired M×N propagation channel characteristics as synthesis characteristics of the linear transform unit and the N×N propagation channel processing unit.

Claim 2 provides a testing apparatus according to claim 1, wherein the linear transform unit receives designated N×M complex numbers to multiply the transmission information of M series signals by the matrix of N rows and M columns to thereby transform the transmission information of M series signals into N synthesis signals.

Claim 3 provides a testing apparatus according to claim 1, wherein the linear transform unit comprises:

a combination selecting unit (22) configured to classify the transmission information of M series signals into N groups in accordance with designated combination information;

a phase shift unit (23) configured to shift a relative phase relationship between the N-classified transmission information signals by rotation on a complex plane in accordance with designated phase information; and an additive synthesis unit (24) configured to add signals included in each of the N groups and shifted in phase from each other to form N synthesis signals, and the parameter setting unit sets information in the combination selecting unit, the phase shift unit and the N×N propagation channel processing unit to acquire characteristics equivalent to characteristics of M×N propagation channels with which the test target is expected to determine that a desired precoding vector included in a set of precoding vectors defined beforehand for the M×N propagation channels is optimal, if the test target is normal.

Claim 4 provides a testing apparatus according to claim 3, wherein the parameter setting unit designates, as a matrix including a matrix corresponding to the desired precoding vector, a unitary matrix of M rows and M columns obtained as one of the factors in the product of the unitary matrix of M rows and M columns, a diagonal matrix of N rows and M columns and a unitary matrix of N rows and N columns when performing singular value decomposition of a propagation channel matrix of N rows and M columns indicating characteristics of M×N propagation channel model formed by the combination selecting unit, the phase shift unit, the additive synthesis unit and the N×N propagation channel processing unit, whereby appropriate values are set for the combination selecting unit, the phase shift unit and the N×N propagation channel processing unit such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

Further, claim 5 provides a testing apparatus according to claim 4, wherein when selecting an optimal precoding vector from arbitrary vectors not limited to predefined precoding vectors, the parameter setting unit is configured to shift part of the parameter information from the appropriate values such that the optimal precoding vector is not included in the predefined precoding vectors.

Claim 6 provides a test method for testing a test target that includes a terminal, a circuit board incorporated in the terminal, or an integrated circuit mounted on the circuit board, the terminal utilizing an M×N (M>N) MIMO scheme in which M antennas are provided on a base station side, and N antennas are provided on a terminal side, the test method including a step of outputting transmission information of M series signals to be sent to the test target.

This test method comprises steps of:

transforming the transmission information of M series signals into N synthesis signals by linear transform expressed by multiplication by a matrix of N rows and M columns that includes complex numbers as elements, based on designated parameter information;

performing, on the N synthesis signals, signal processing corresponding to a modulation technique of the test target;

performing N×N pseudo propagation channel processing on N signals subjected to the signal processing, based on designated propagation channel information, and supplying resultant N signals to the test target; and setting, before the outputting the transmission information of M series signals, information necessary for the linear transform and the N×N pseudo propagation channel processing, to acquire desired M×N propagation channel characteristics as synthesis characteristics for the linear transform unit and the N×N pseudo propagation channel processing.

In the test method according to claim 6, recited in claim 7, the step of transforming the transmission information of M series signals includes a step of receiving designated N×M complex numbers to multiply the transmission information of M series signals by a matrix of N rows and M columns to thereby transform the transmission information of M series signals into N synthesis signals.

Claim 8 provides a test method according to claim 6, wherein the step of transforming the transmission information of M series signals includes steps of:

allocating the transmission information of M series signals into N groups based on designated combination information;

performing a phase shift to change a relative positional relationship between the transmission information signals classified into the N groups, by rotation on a complex plane based on designated phase information; and performing an additive synthesis to add signals included in each of the N groups and shifted in phase relationship, to form N synthesis signals, the step of setting the information including a step of setting information for the step of combining the transmission information of M series signals, the step of performing the phase shift, the step of performing the additive synthesis, and the step of performing the N×N pseudo propagation channel processing such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

Claim 9 provides a test method according to claim 8, wherein the step of setting the information includes a step of designating, as a matrix including a matrix corresponding to the desired precoding vector, a unitary matrix of M rows and M columns obtained as one of the factors in the product of the unitary matrix of M rows and M columns, a diagonal matrix of N rows and M columns and a unitary matrix of N rows and N columns when performing singular value decomposition of a propagation channel matrix of N rows and M columns indicating characteristics of an M×N propagation channel model which is set by utilizing the step of allocating, the step of performing the phase shift, the step of performing the additive synthesis and the step of performing the N×N pseudo propagation channel processing, whereby appropriate values are set for the step of combining the transmission information of M series signals, the step of performing the phase shift and the step of performing the additive synthesis such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

Claim 10 provides a testing method according to claim 9, wherein when an optimal precoding vector is selected from arbitrary vectors not limited to predefined precoding vectors, the step of setting the information includes a step of shifting part of the parameter information from the appropriate values such that the optimal precoding vector is not included in the predefined precoding vectors.

As described above, the testing apparatus for MIMO systems provides equivalent M×N propagation channels by subjecting transmission information of M series signals to linear transform processing expressed by multiplication of a matrix of N rows and M columns having complex numbers as elements, in accordance with designated information, to thereby transform the transmission information of M series signals into N synthesis signals, then performing, on the N synthesis signals, signal processing corresponding to the modulation technique of a test target, and performing N×N pseudo propagation channel processing on the processed N signals in accordance with designated information. Thus, information necessary for the linear transform processing and the N×N pseudo propagation channel processing is set so as to obtain desired M×N propagation channel characteristics as the synthesis characteristics of the linear transform processing and the N×N pseudo propagation channel processing.

As a result, the number of signal processing units that require respective large-scale hardware structures can be reduced from M to N.

Further, when the linear transform unit is configured to receive designated N×M complex numbers and multiply the transmission information of M series signals by a matrix of N rows and M columns to thereby transform the transmission information of M series signals into N synthesis signals, M×N propagation channels of arbitrary characteristics can be realized as the synthesis characteristics of the linear transform unit and the N×N propagation channel processing unit.

Furthermore, when the linear transform unit is formed of the combination selecting unit, the phase shift unit and the additive synthesis unit, linear transform can be executed by extremely simple selection processing using a switch, multiplication processing and addition processing. This means that transform processing can be realized with a circuit scale significant smaller than that of a circuit for performing complex processing, such as IFFT, thereby significantly reducing the required apparatus cost.

Also, when the transmission information generating unit is formed of a programmable processor in an existing MIMO system testing apparatus, the function of each of the combination selecting unit, the phase shift unit and the additive synthesis unit can be easily added simply by reprogramming. As a result, an N×N MIMO testing apparatus can be substantially extended to an M×N (M>N) MIMO testing apparatus.

In addition, when an optimal precoding vector is selected from arbitrary vectors not limited to predefined precoding vectors, if part of parameter information is shifted from appropriate values so as not to include the optimal precoding vector in the predefined ones, testing in a state close to the actual propagation channel environment can be realized.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a testing apparatus for testing MIMO systems, according to an embodiment of the invention;

FIG. 4 is a table showing combinations of precoding vector index values and setting parameters for realizing the propagation channel matrix which makes the precoding vector of each index optimal for beam forming;

FIG. 5 is a table showing other combinations of precoding vector index values and setting parameters for realizing the propagation channel matrix which makes the precoding vector of each index optimal for beam forming;

FIG. 7 is a table showing changes in index value determined optimal in accordance with changes in shifted phase $\phi$;

FIG. 8 is a block diagram showing the configuration of a testing apparatus for testing MIMO systems, according to another embodiment of the invention; and FIG. 9 is a block diagram showing the configuration of a conventional M×N propagation channel testing apparatus.

DETAILED DESCRIPTION OF THE INVENTION

Figure 2C:
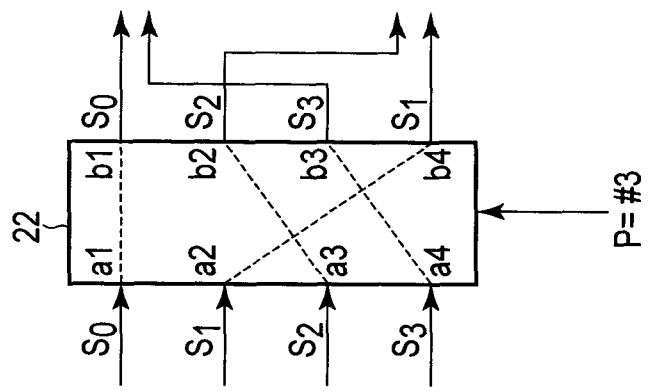
FIGS. 2A, 2B and 2C are connection diagrams useful in explaining the operation of a combination selecting unit incorporated in the testing apparatus of FIG. 1.

Various embodiments will be described hereinafter with reference to the accompanying drawings.

FIG. 1 shows the configuration of a testing apparatus 20 for M×N (M>N) MIMO systems, according to an embodiment of the invention. The testing apparatus 20 of the embodiment is of M×N (M=4, N=2) type.

The testing apparatus 20 comprises a transmission information generating unit 21, a combination selecting unit 22, a phase shift unit 23, an additive synthesis unit 24, two (=N) signal processing units $25_1$ and $25_2$, a 2×2 (=N×N) propagation channel processing unit 26 and a parameter setting unit 27.

The transmission information generating unit 21 generates and outputs four (=M) transmission information signals s0 to s3 to be transmitted to a test target 1. The transmission information signals s0 to s3 are source signals unique to a modulation technique. For instance, in the case of the modulation technique OFDMA for use in LTE or the modulation technique OFDM for use in wireless LAN, the transmission information signals s0 to s3 correspond to symbol data for each subcarrier. The transmission information generating unit 21 may directly output symbol data, or may output the modified symbol data after precoding it using one of the precoding vectors prestored in a codebook (not shown).

Figure 2B:
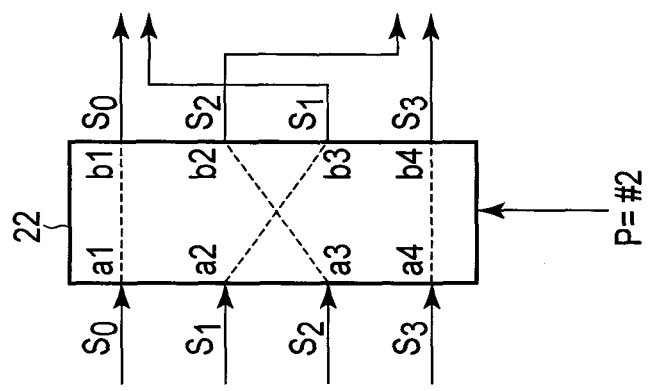
Figure 2A:
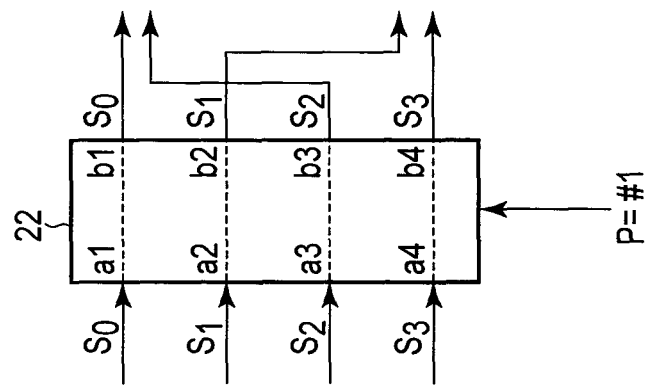

As shown in FIGS. 2A to 2C, the combination selecting unit 22 classifies the four (=M) transmission information signals s0 to s3 into two (=N) groups in accordance with designated combination information P (#1 to #3), and outputs the resultant signals to the phase shift unit 23.

The phase shift unit 23 shifts the relative phase relationship between the transmission information signals, classified into two groups, in accordance with designated phase information (including gain information), utilizing rotation on the complex plane. More specifically, the phase shift unit 23 comprises multipliers 23a to 23d configured to multiply four input information sequences by respective coefficients g0, g1, g2ej$\theta$2 and g3ej$\theta$3, and outputs, to the additive synthesis unit 24, the signals obtained by multiplying, by these coefficients, the respective signals selected by the combination selecting unit 22. Parameters g0 to g3, $\theta$2 and $\theta$3 are set by the parameter setting unit 27.

The additive synthesis unit 24 comprises adders 24a and 24b, and forms two synthesis signals by adding the signals of each of the two (=N) groups, which have been shifted in phase.

By thus shifting in phase each pair of the four (=M) transmission information signals and transforming the resultant four signals into two synthesis signals Sa and Sb by additive synthesis, the transmitter side signal number can be changed from 4 (=M) to 2 (=N).

The combination selecting unit 22, the phase shift unit 23 and the additive synthesis unit 24 perform linear transform in which pairs of input signals are selected and subjected to phase rotation and additive synthesis. Therefore, the combination of these elements is regarded as one example of a linear transform unit 28 described later.

The two synthesis signals Sa and Sb are input to the two signal processing units $25_1$ and $25_2$ respectively, where they are subjected to signal processing corresponding to the modulation technique of the test target 1.

For instance, if the modulation technique is OFDMA or OFDM, each of the sign processing units $25_1$ and $25_2$ comprises an inverse Fourier transformer (IFFT) 25a, a CP inserting unit 25b and a bandpass filter (BPF) 25c, as in the aforementioned conventional case.

The two signals Sa' and Sb' output from the two signal processing units $25_1$ and $25_2$ are input to the 2×2 propagation channel processing unit 26, where the signals are subjected to 2×2 pseudo propagation channel processing based on designated propagation channel information. Two signals r1 and r2 obtained by this processing are applied to the test target 1.

If the test target 1 is a terminal, such as a mobile terminal, configured to perform communication using radio frequency (RF) signals, a transmission unit (not shown) for performing orthogonal modulation processing and frequency transform processing is provided after the 2×2 propagation channel processing unit 26.

The 2×2 propagation channel processing unit 26 has four paths that connect the two input ports to each of the two output ports. Propagation channel characteristics h11, h12, h21 and h22 are defined for the respective paths.

If the test target 1 having received the two signals r1 and r2 from the propagation channel processing unit 26 is assumed to be normal, the parameter setting unit 27 designates information P for the combination selecting unit 22, phase information (coefficient information) for the phase shift unit 23, and propagation channel information for the 2×2 propagation channel processing unit 26, so that characteristics equivalent to those of the 4×2 propagation channels for selecting, as an optimal precoding vector, a desired precoding vector included in a set of precoding vectors beforehand defined for the 4×2 propagation channels can be acquired.

Namely, in the testing apparatus 20, since the combination selecting unit 22, the phase shift unit 23, the additive synthesis unit 24 and the 2×2 propagation channel processing unit 26 provide 4×2 propagation channels equivalent to the conventional 4×2 propagation channels. This enables the number of signal processing units of large-scale hardware to be reduced to two (i.e., signal processing units $25_1$ and $25_2$) while realizing 4×2 MIMO scheme. As a result, significant cost reduction can be realized.

Further, since it is sufficient if the combination selecting unit 22, the phase shift unit 23 and the additive synthesis unit 24 perform extremely simple processing, such as selection, multiplication and addition, these elements can be realized by circuits of a much smaller circuit scale than in a circuit that performs complex processing such as IFFT.

Also, if in an existing 2×2 MIMO testing apparatus, the transmission information generating unit 21 comprises, for example, a field programmable gate array (FPGA), the functions of the combination selecting unit 22, the phase shift unit 23 and the additive synthesis unit 24 can be easily added by changing the program, whereby the 2×2 MIMO testing apparatus can be substantially extended to a 4×2 MIMO testing apparatus.

In the testing apparatus 20 of the above-described configuration, however, since the number of transmission signals is reduced from 4 to 2, 4×2 propagation channels of the conventional apparatus, in which characteristics can be arbitrarily designated for each path, cannot be realized in principle, but only under a certain constraint, parameters can be set for propagation channels. Namely, a simple user interface that sets arbitrary characteristics for each path as in the conventional 4×2 propagation channels cannot be used. This may make it difficult for a user to set parameters.

In view of the above, in the present invention, a precoding vector itself that should be judged optimal on a normal test target side is set as one of the setting parameters for propagation channels. For this purpose, an M×N propagation channel matrix will be expressed as a singular value decomposition form. If a user interface configured to designate propagation channel characteristics for each singular-value-decomposed matrix using a combination of a finite number of parameters is employed, it can set parameters that a user can intuitively understand. This point will now be described.

Firstly, a consideration will be given to how propagation channel characteristics are restricted when spatial multiplexing transmission of two layers through four antennas is executed using two physical antennas.

Figure 3:
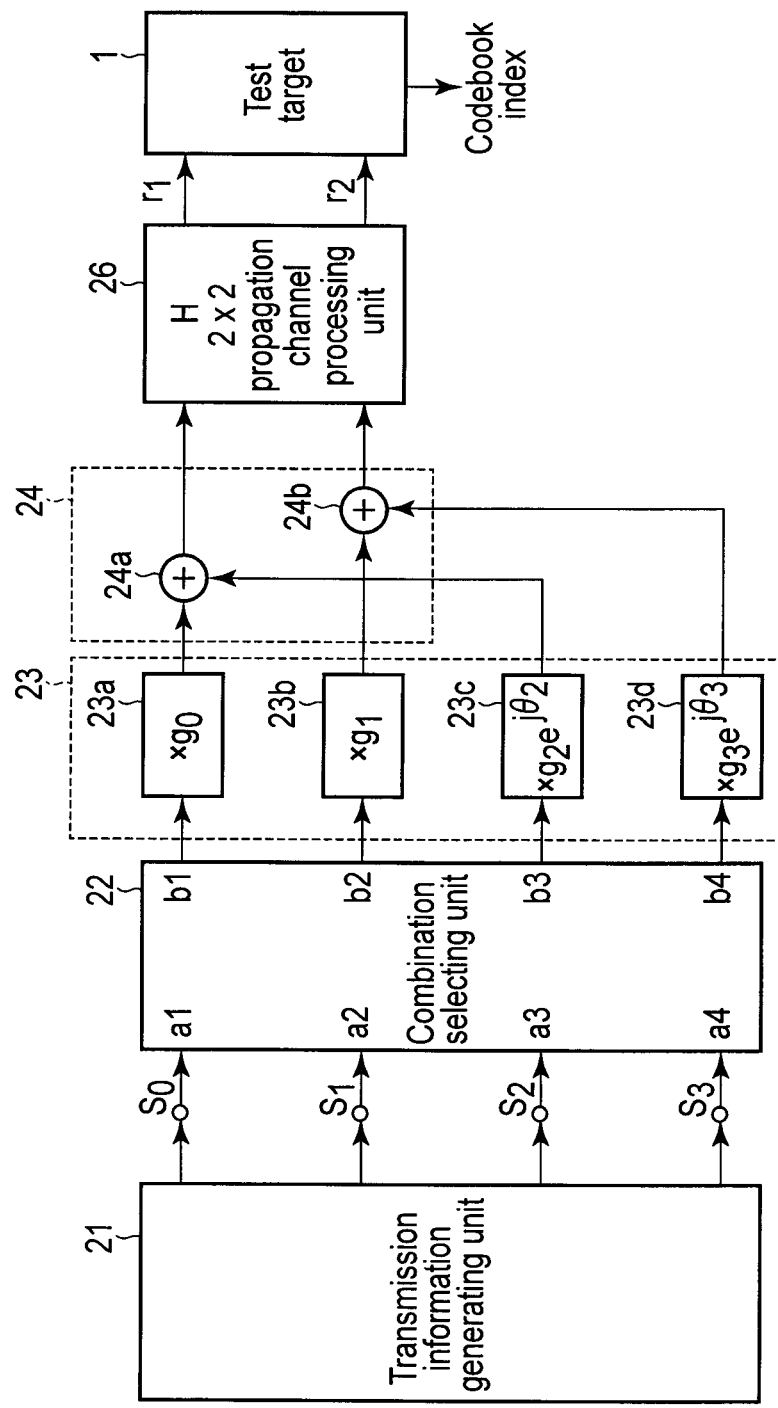
FIG. 3 is a block diagram representing the testing apparatus of FIG. 1, simplified by paying attention only to flow of information.

A model as shown in FIG. 3, where attention is paid only to flow of information and the signal processing units $25_1$ and $25_2$ of FIG. 1 are omitted, will be described.

In this model, the two input signals R (=r1 and r2) is given by the following equation (1):

$$[R] = [H][G][P][S] \quad (1)$$

$$= \begin{bmatrix} r_1 \\ r_2 \end{bmatrix}$$

$$= \begin{bmatrix} h_{11} & h_{12} \\ h_{21} & h_{22} \end{bmatrix} \begin{bmatrix} g_0 & 0 & g_2 e^{j\theta_2} & 0 \\ 0 & g_1 & 0 & g_3 e^{j\theta_3} \end{bmatrix} [p] \begin{bmatrix} s_0 \\ s_1 \\ s_2 \\ s_3 \end{bmatrix}$$

$$[P] = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \text{ or } \begin{bmatrix} 1 & 0 & 0 & 0 \\ 0 & 0 & 1 & 0 \\ 0 & 1 & 0 & 0 \\ 0 & 0 & 0 & 1 \end{bmatrix} \text{ or } \begin{bmatrix} 1 & 0 & 0 & 0 \\ 0 & 0 & 1 & 0 \\ 0 & 0 & 0 & 1 \\ 0 & 1 & 0 & 0 \end{bmatrix}$$

$$(\#1) \qquad (\#2) \qquad (\#3)$$

where a matrix S of four rows and one column represents transmission information signals output from the transmission information generating unit 21, a matrix P of four rows and four columns represents the combination selecting unit 22, a matrix G of two rows and four columns represents the phase shift unit 23 and the additive synthesis unit 24, and a matrix H of two rows and two columns represents the 2×2 propagation channel processing unit 26.

Further, if the first matrix (#1) (leftmost one) has been selected as the matrix P, the inputs and outputs of the combination selecting unit 22 become as shown in FIG. 2A. Similarly, if the second matrix (#2) (middle one) has been selected as the matrix P, the inputs and outputs of the combination selecting unit 22 become as shown in FIG. 2B, and if the third matrix (#3) (rightmost one) has been selected as the matrix P, the inputs and outputs of the combination selecting unit 22 become as shown in FIG. 2C.

A description will now be given using LTE as an example. If a precoding vector W is included in two-layer spatial multiplexing transmission, the case of without CDD (TM3: closed loop spatial multiplexing) is given by the following equation (2), and the case of large delay CDD (TM4: open loop spatial multiplexing) is given by the following equation (3):

$$\begin{bmatrix} r_1 \\ r_2 \end{bmatrix} = \begin{bmatrix} h_{11} & h_{12} \\ h_{21} & h_{22} \end{bmatrix} \begin{bmatrix} g_0 & 0 & g_2 e^{j\theta_2} & 0 \\ 0 & g_1 & 0 & g_3 e^{j\theta_3} \end{bmatrix} [p] \begin{bmatrix} w_{11} & w_{12} \\ w_{21} & w_{22} \\ w_{31} & w_{32} \\ w_{41} & w_{42} \end{bmatrix} \begin{bmatrix} x_1 \\ x_2 \end{bmatrix} \quad (2)$$

$$\begin{bmatrix} r_1 \\ r_2 \end{bmatrix} = \begin{bmatrix} h_{11} & h_{12} \\ h_{21} & h_{22} \end{bmatrix} \begin{bmatrix} g_0 & 0 & g_2 e^{j\theta_2} & 0 \\ 0 & g_1 & 0 & g_3 e^{j\theta_3} \end{bmatrix} [p] \begin{bmatrix} w_{11} & w_{12} \\ w_{21} & w_{22} \\ w_{31} & w_{32} \\ w_{41} & w_{41} \end{bmatrix} [D][U] \begin{bmatrix} x_1 \\ x_2 \end{bmatrix} \quad (3)$$

where [D] and [U] in the equation (3) are 2×2 matrices defined in Table 6.3.4.2.2-1 of TS36.211.

In the above equations (2) and (3), the rank of the propagation channel matrix H is 1 or 2, and that of [D] [U] in the equation (3) is always 2. The matrix rank is not greater than the minimum rank of each matrix. The "matrix rank" indicates the number of independent information channels that can be multiplexed, assuming that the propagation channels represented by each matrix are subjected to spatial multiplexing.

Accordingly, the rank of the entire propagation channels depends on the rank of the matrix $W_{2\times 2}$ given by the following mathematical expression:

$$W_{2\times 2} \equiv \begin{bmatrix} g_0 & 0 & g_2 e^{j\theta_2} & 0 \\ 0 & g_1 & 0 & g_3 e^{j\theta_3} \end{bmatrix} [P] \begin{bmatrix} w_{11} & w_{12} \\ w_{21} & w_{22} \\ w_{31} & w_{32} \\ w_{41} & w_{42} \end{bmatrix}$$

For instance, if the rank of the matrix $W_{2\times 2}$ is 1, the rank of the entire propagation channels 0 or 1, and if the rank of the matrix $W_{2\times 2}$ is 0, the rank of the entire propagation channels 0.

Further, if the elements of the matrix G is fixed, for example, such that g0=g1=g3=1, θ2=θ3=0, P=I4 (an identity matrix of four rows and four columns), the rank of the matrix $W_{2\times 2}$ in a certain codebook index becomes 0 or 1. Therefore, these parameters cannot be fixed.

Suppose that the portion below, which is included in the above equations (2) and (3), is defined as 4×2 propagation channels $H_{4\times 2}$ as given below:

$$H_{4\times 2} = \begin{bmatrix} h_{11} & h_{12} \\ h_{21} & h_{22} \end{bmatrix} \begin{bmatrix} g_0 & 0 & g_2 e^{j\theta_2} & 0 \\ 0 & g_1 & 0 & g_3 e^{j\theta_3} \end{bmatrix} [P]$$

Further, suppose that the following equation (4) is obtained if the above is subjected to singular value decomposition:

$$H_{4\times 2} = \begin{bmatrix} h_{11} & h_{12} \\ h_{21} & h_{22} \end{bmatrix} \begin{bmatrix} g_0 & 0 & g_2 e^{j\theta_2} & 0 \\ 0 & g_1 & 0 & g_3 e^{j\theta_3} \end{bmatrix} [P] = [U][D][V^H] \quad (4)$$

[V], [U]: Unitary matrix [D]: Diagonal matrix

In the above equation (4), a 4×2 matrix, which is included in four column vectors of a unitary matrix V of four rows and four columns and includes the same column vectors as the two column vectors corresponding to two singular values other than 0, represents precoding vectors for realizing optimal beam forming. The expression "the two column vectors corresponding to two singular values other than 0" means the two column vectors which are multiplied by the singular values when $[D][V^H]$ is obtained.

When the function, incorporated in the test target 1, of selecting an optimal precoding vector is tested, it is considered that an environment, in which propagation channel characteristics for enabling the each of precoding vectors corresponding to codebook indices 0 to 15 to be optimal can be set, is required as a test environment (in this case, only a case where static propagation channels of a flat frequency characteristic are used).

A description will be given of the fact that if the propagation channel model given by the above equation (4) is used, propagation channels that make each precoding vector for the four antennas and two layers defined under the LTE standards optimal can be set.

$$\begin{bmatrix} h_{11} & h_{12} \\ h_{21} & h_{22} \end{bmatrix} = [U][D_0][V_0^H] \quad (5)$$

[U], [$V_0$]: 2×2 unitary matrix

[$D_0$]: 2×2 diagonal matrix

If the above equation (5) is satisfied, the equation (4) can be rewritten as the following equation (6), assuming that g0 to g3 are set to 1:

$$\begin{aligned} H_{4\times 2} &= \begin{bmatrix} h_{11} & h_{12} \\ h_{21} & h_{22} \end{bmatrix} \begin{bmatrix} 1 & 0 & e^{j\theta_2} & 0 \\ 0 & 1 & 0 & e^{j\theta_3} \end{bmatrix} [P] \\ &= [U][D_0] \begin{bmatrix} [V_0] \\ \begin{bmatrix} e^{-j\theta_2} & 0 \\ 0 & e^{-j\theta_3} \end{bmatrix} [V_0] \end{bmatrix}^H [P] \\ &= [U](\sqrt{2}\,[D_0])\left([P]^H \begin{bmatrix} e^{j\theta_{11}} & e^{j\theta_{12}} \\ e^{j\theta_{21}} & e^{j\theta_{22}} \\ e^{j(\theta_{11}-\theta_2)} & e^{j(\theta_{12}-\theta_2)} \\ e^{j(\theta_{21}-\theta_3)} & e^{j(\theta_{22}-\theta_3)} \end{bmatrix} \middle/ \sqrt{4}\right)^H \end{aligned} \quad (6)$$

where, $$[V_0] = \begin{bmatrix} e^{j\theta_{11}} & e^{j\theta_{12}} \\ e^{j\theta_{21}} & e^{j\theta_{22}} \end{bmatrix} \middle/ \sqrt{2}$$

If [P] is an identity matrix, the following equation (7) is established:

$$(\#1) \text{ If } [P] = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad (7)$$

$$H_{4\times 2} = [U](\sqrt{2}\,[D_0])\left(\begin{bmatrix} e^{j\theta_{11}} & e^{j\theta_{12}} \\ e^{j\theta_{21}} & e^{j\theta_{22}} \\ e^{j(\theta_{11}-\theta_2)} & e^{j(\theta_{12}-\theta_2)} \\ e^{j(\theta_{21}-\theta_3)} & e^{j(\theta_{22}-\theta_3)} \end{bmatrix} \middle/ \sqrt{4}\right)^H$$

Further, [P] satisfies that following, equation (8) is established:

$$(\#2) \text{ If } [P] = \begin{bmatrix} 1 & 0 & 0 & 0 \\ 0 & 0 & 1 & 0 \\ 0 & 1 & 0 & 0 \\ 0 & 0 & 0 & 1 \end{bmatrix}, \quad (8)$$

$$H_{4\times 2} = [U](\sqrt{2}\,[D_0])\left(\begin{bmatrix} e^{j\theta_{11}} & e^{j\theta_{12}} \\ e^{j(\theta_{11}-\theta_2)} & e^{j(\theta_{12}-\theta_2)} \\ e^{j\theta_{21}} & e^{j\theta_{22}} \\ e^{j(\theta_{21}-\theta_3)} & e^{j(\theta_{22}-\theta_3)} \end{bmatrix} \middle/ \sqrt{4}\right)^H$$

Yet further, [P] satisfies that following, equation (9) is established:

$$(\#3) \text{ If } [P] = \begin{bmatrix} 1 & 0 & 0 & 0 \\ 0 & 0 & 1 & 0 \\ 0 & 0 & 0 & 1 \\ 0 & 1 & 0 & 0 \end{bmatrix}, \quad (9)$$

$$H_{4\times 2} = [U](\sqrt{2}\,[D_0])\left(\begin{bmatrix} e^{j\theta_{11}} & e^{j\theta_{12}} \\ e^{j(\theta_{21}-\theta_3)} & e^{j(\theta_{22}-\theta_3)} \\ e^{j\theta_{21}} & e^{j\theta_{22}} \\ e^{j(\theta_{11}-\theta_2)} & e^{j(\theta_{12}-\theta_2)} \end{bmatrix} \middle/ \sqrt{4}\right)^H$$

FIGS. 4 and 5 show, as an example, the phases of precoding vector components for four antennas and two layers defined in the LTE standards, and the results of attempts to obtain setting for generating the propagation channel matrix which makes the precoding vectors optimal for beam forming corresponding to the phases, based on the above-mentioned equations (the unit of angles is "degree").

Thus, the operation of the test target 1 can be detected by beforehand storing the information shown in FIGS. 4 and 5 in a memory (not shown), and by causing the parameter setting unit 27 to do the following when a codebook index value k corresponding to a desired precoding vector is designated by an operating unit (not shown). Namely, when the codebook index value k is designated, the parameter setting unit 27 reads, from the memory, a selection matrix P and each phase information item θ11 to θ22, θ2, θ3 corresponding to index value k, sets the selection matrix P in the combination selecting unit 22, and sets θ2, θ3, g0 to g3 (=1) in the phase shift unit 23.

At this time, if the test target 1 has reported the same index value as the designated codebook index value k, the test target 1 can be determined to be normal, while if the test target 1 has reported a different index value, its operation can be determined abnormal.

User's convenience of performing the above propagation channel setting will be described.

It is most intuitively understandable if, as the form of singular value decomposition of the 4×2 propagation channels, the unitary matrix portion of the input stage of the propagation channels is set on a basis of 16 kinds of precoding vectors stipulated in the LTE standards. Namely, a table number that should be used as a beam forming vector is set.

However, assume that the following matrices are provided in the preceding stage, in order to enable testing in a state close to the actual propagation channel environment, which shift from setting in which an optimal precoding vector is always found in the precoding vector table of 4 rows and two columns stipulated in TS36.211 Table 6.3.4.2.3-2 of the 3GPP standards (if in this processing, angle shift from the angles θ11 to θ22, θ2 and θ3 shown in FIGS. 4 and 5 is performed in each case, the above-mentioned shift can be realized).

$$\begin{bmatrix} g_0 & 0 & 0 & 0 \\ 0 & g_1 & 0 & 0 \\ 0 & 0 & g_2 & 0 \\ 0 & 0 & 0 & g_3 \end{bmatrix} \begin{bmatrix} e^{j\frac{\phi}{2}} & 0 & 0 & 0 \\ 0 & e^{-j\frac{\phi}{2}} & 0 & 0 \\ 0 & 0 & e^{j\frac{\phi}{2}} & 0 \\ 0 & 0 & 0 & e^{-j\frac{\phi}{2}} \end{bmatrix}$$

The shifting processing based on $\phi$ is given by the following mathematical expressions:

$$\text{If } [P] = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad (\#1)$$

$$\begin{cases} \theta'_{11} = \theta_{11} - \phi/2 & \theta'_{12} = \theta_{12} - \phi/2 \\ \theta'_{21} = \theta_{21} + \phi/2 & \theta'_{22} = \theta_{22} + \phi/2 \\ \theta'_2 = \theta_2 \\ \theta'_3 = \theta_3 \end{cases}$$

$$\text{If } [P] = \begin{bmatrix} 1 & 0 & 0 & 0 \\ 0 & 0 & 1 & 0 \\ 0 & 1 & 0 & 0 \\ 0 & 0 & 0 & 1 \end{bmatrix}, \quad (\#2)$$

or $$\text{If } [P] = \begin{bmatrix} 1 & 0 & 0 & 0 \\ 0 & 0 & 1 & 0 \\ 0 & 0 & 0 & 1 \\ 0 & 1 & 0 & 0 \end{bmatrix}, \quad (\#3)$$

$$\begin{cases} \theta'_{11} = \theta_{11} - \phi/2 & \theta'_{12} = \theta_{12} - \phi/2 \\ \theta'_{21} = \theta_{21} + \phi/2 & \theta'_{22} = \theta_{22} - \phi/2 \\ \theta'_2 = \theta_2 - \phi \\ \theta'_3 = \theta_3 - \phi \end{cases}$$

This processing is performed by the parameter setting unit 27, whereby θ11 to θ22, θ2 and θ3 are replaced with the resultant θ11' to θ22', θ2' and θ3'. Further, also by setting g0 to g3 to different values other than 1, setting can be shifted from that wherein optimal precoding vectors can be detected.

Figure 6:
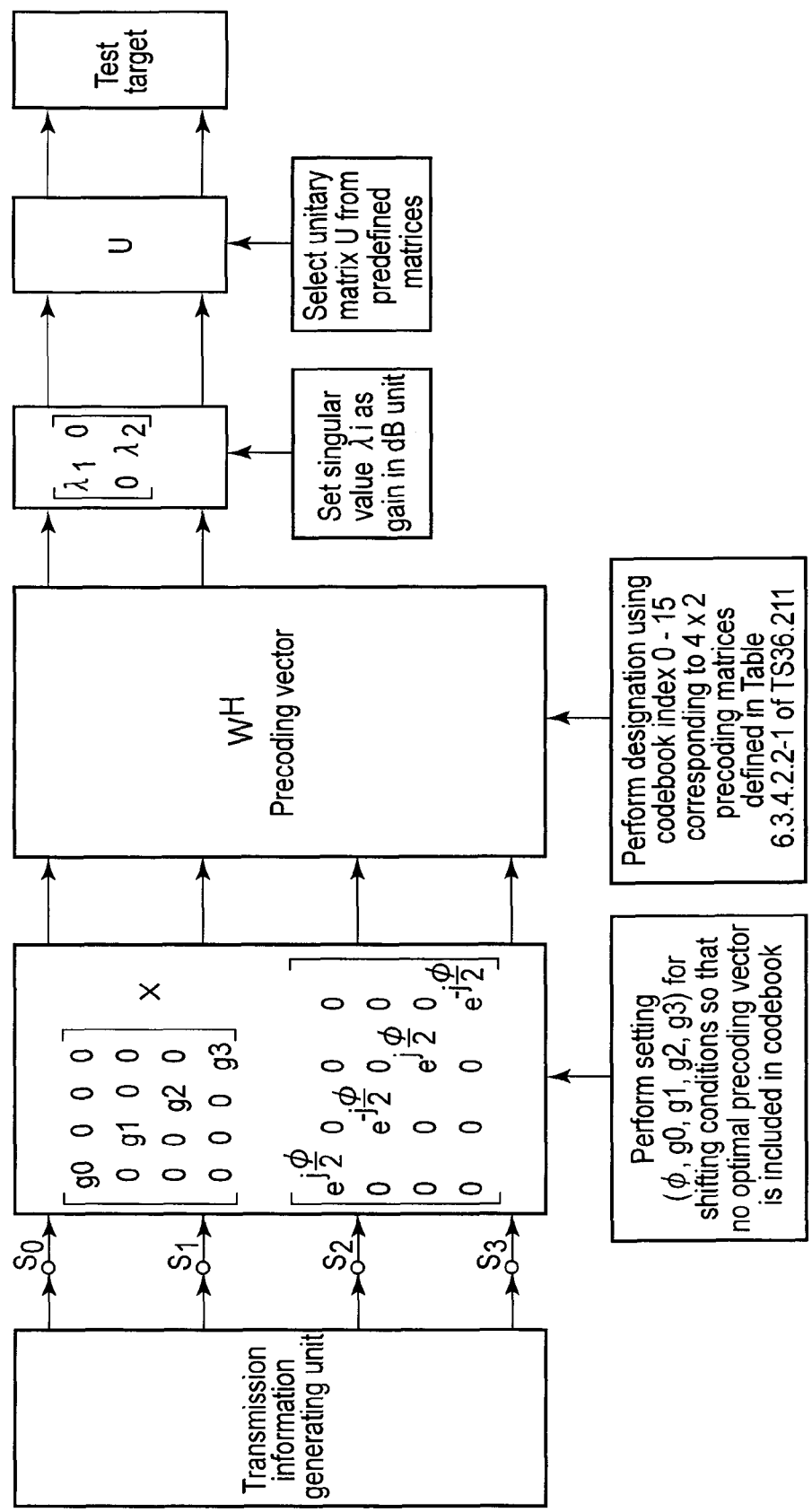
FIG. 6 is a block diagram useful in explaining a user interface incorporated in the testing apparatus of FIG. 1.

FIG. 6 shows a user interface for realizing the above. This user interface is shown as to indicate parameters to be designated by a user through a designation unit (not shown). An arbitrary designation method can be employed in the user interface.

For instance, if the content of FIG. 6 is displayed on the screen of a display unit (not shown) to enable the user to set desired parameters $\phi$ and g0 to g3, a codebook index value, singular values λ1 and λ2, and unitary matrix U on the screen, the user interface will be convenient. Alternatively, an arbitrary combination may be selected from preset parameter combinations.

The settings of the coefficients g0 to g3 shown in FIG. 6 will differ in correspondence from those of the same coefficients shown in FIGS. 1 and 3 if the routes in the combination selecting unit 22 are rearranged.

The technical meaning of the user interface shown in FIG. 6 will be described.

If parameters are designated for propagation channels using the user interface, optimal precoding vectors to be used for the propagation channels can be easily designated. The term "optimal precoding vector" means a precoding vector that makes the received signal power of the test target 1 maximum by the effect of beam forming.

Assuming that g0 to g3=0 dB and the shifted phase $\phi$=0 degree, the 4×2 propagation channel matrix is given by the following mathematical expression (10):

$$\begin{bmatrix} h_{11} & h_{12} & h_{13} & h_{14} \\ h_{21} & h_{22} & h_{23} & h_{24} \end{bmatrix} \equiv \begin{bmatrix} u_{11} & u_{12} \\ u_{21} & u_{22} \end{bmatrix} \begin{bmatrix} \lambda_1 & 0 \\ 0 & \lambda_2 \end{bmatrix} \begin{bmatrix} w_{11} & w_{12} \\ w_{21} & w_{22} \\ w_{31} & w_{32} \\ w_{41} & w_{42} \end{bmatrix}^H \quad (10)$$

If the following matrix included in the above expression (10) indicates codebook index k for a precoding vector for four antennas and two layers stipulated in the communication standards, $$\begin{bmatrix} w_{11} & w_{12} \\ w_{21} & w_{22} \\ w_{31} & w_{32} \\ w_{41} & w_{42} \end{bmatrix}$$

it can be tested whether the test target 1 connected through the propagation channels informs appropriate codebook index.

If the test target 1 informs the codebook index=i, and if two layer information is sent using the precoding vector, the following equation is established:

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \left( \begin{bmatrix} w_{i11} & w_{i12} \\ w_{i21} & w_{i22} \\ w_{i31} & w_{i32} \\ w_{i41} & w_{i42} \end{bmatrix} \middle/ \sqrt{2} \right) \begin{bmatrix} x_1 \\ x_2 \end{bmatrix} \quad (11)$$

$$= \begin{bmatrix} u_{11} & u_{12} \\ u_{21} & u_{22} \end{bmatrix} \begin{bmatrix} \lambda_1 & 0 \\ 0 & \lambda_2 \end{bmatrix} \left( \begin{bmatrix} w_{k11} & w_{k12} \\ w_{k21} & w_{k22} \\ w_{k31} & w_{k32} \\ w_{k41} & w_{k42} \end{bmatrix}^H \begin{bmatrix} w_{i11} & w_{i12} \\ w_{i21} & w_{i22} \\ w_{i31} & w_{i32} \\ w_{i41} & w_{i42} \end{bmatrix} \middle/ \sqrt{2} \right) \begin{bmatrix} x_1 \\ x_2 \end{bmatrix}$$

$$= \begin{bmatrix} u_{11} & u_{12} \\ u_{21} & u_{22} \end{bmatrix} \begin{bmatrix} \lambda_1 & 0 \\ 0 & \lambda_2 \end{bmatrix} [w_{k1} \ w_{k2}]^H ([w_{i1} \ w_{i2}] / \sqrt{2}) \begin{bmatrix} x_1 \\ x_2 \end{bmatrix}$$

$$= \frac{1}{\sqrt{2}} \begin{bmatrix} u_{11} & u_{12} \\ u_{21} & u_{22} \end{bmatrix} \begin{bmatrix} \lambda_1 & 0 \\ 0 & \lambda_2 \end{bmatrix} \begin{bmatrix} w_{k1}^H w_{i1} & w_{k1}^H w_{i2} \\ w_{k2}^H w_{i1} & w_{k2}^H w_{i2} \end{bmatrix} \begin{bmatrix} x_1 \\ x_2 \end{bmatrix}$$

$$= \frac{1}{\sqrt{2}} \begin{bmatrix} u_{11} & u_{12} \\ u_{21} & u_{22} \end{bmatrix} \begin{bmatrix} \lambda_1 & 0 \\ 0 & \lambda_2 \end{bmatrix} \begin{bmatrix} \langle w_{k1}, w_{i1} \rangle & \langle w_{k1}, w_{i2} \rangle \\ \langle w_{k2}, w_{i1} \rangle & \langle w_{k2}, w_{i2} \rangle \end{bmatrix} \begin{bmatrix} x_1 \\ x_2 \end{bmatrix}$$

where, $$w_{k1} \equiv \begin{bmatrix} w_{k11} \\ w_{k21} \\ w_{k31} \\ w_{k41} \end{bmatrix}$$

$$w_{k2} \equiv \begin{bmatrix} w_{k12} \\ w_{k22} \\ w_{k32} \\ w_{k42} \end{bmatrix}$$

where <a, b> represents the inner product of two vectors a and b.

Since column vectors w, x and y are unit vectors, the inner product of the two vectors are maximum if the two vectors are identical. Namely, the codebook indexes to be selected by the normal test target 1 in the above equation (11) are the same as the k included in the matrix for propagation channels.

In other words, the user interface of FIG. 6 is of the form corresponding to the equation (10) obtained by subjecting the 4×2 propagation channels to singular value decomposition, and one ($W^H$) of the unitary matrices on the transmitter side can be selected from a codebook used on the transmitter side. Further, the singular value λi as an element of a diagonal matrix ($D_0$) can be set as a coefficient representing the gain of each of two signal streams, and the unitary matrix U on the receiver side can be selected from preset unitary matrices, which is one example of an interface.

Further, since parameters φ and g0 to g3 for incorporating shifts in the unitary matrix on the transmitter side are prepared, optimal precoding vectors can be shifted from the values stored in the codebook.

The advantage of changing the phase φ in FIG. 6 will be shown, using a simple example.

Assuming here that the following is satisfied:

$$\begin{bmatrix} u_{11} & u_{12} \\ u_{21} & u_{22} \end{bmatrix} = \begin{bmatrix} 1 & 0 \\ 0 & 1 \end{bmatrix}$$

$$\begin{bmatrix} \lambda_1 & 0 \\ 0 & \lambda_2 \end{bmatrix} = \begin{bmatrix} 1 & 0 \\ 0 & 0 \end{bmatrix}$$

$$g_0 \sim g_3 = 1$$

In this case, the propagation channel model can be expressed as the following mathematical expression (12). The propagation channel model will vary depending upon changes in codebook index k and shifted phase φ.

$$H(k, \phi) \equiv \begin{bmatrix} 1 & 0 \\ 0 & 0 \end{bmatrix} \begin{bmatrix} w_{k11} & w_{k12} \\ w_{k21} & w_{k22} \\ w_{k31} & w_{k32} \\ w_{k41} & w_{k42} \end{bmatrix}^H \begin{bmatrix} e^{j\frac{\phi}{2}} & 0 & 0 & 0 \\ 0 & e^{-j\frac{\phi}{2}} & 0 & 0 \\ 0 & 0 & e^{j\frac{\phi}{2}} & 0 \\ 0 & 0 & 0 & e^{-j\frac{\phi}{2}} \end{bmatrix} \quad (12)$$

In the case of, for example, TM4 one layer (a spatial multiplexing operation mode of one layer) of LTE, the precoding vectors that enable maximum signal power to be received by the test target 1 can be detected by the following equation (13):

$$i \text{ best} = \operatorname{argmax}_i \left\| H(k, \phi) \begin{bmatrix} w_{i11} \\ w_{i21} \\ w_{i31} \\ w_{i41} \end{bmatrix} [x_1] \right\|^2 \quad (13)$$

The table of FIG. 7 shows the result of the calculation.

In the equation (13), if φ=0, the designated index value k is identical to the index value determined optimal on the receiver side, which means that an optimal precoding vector is found in the codebook. In contrast, when the shifted phase φ is varied beginning with 0, a state in which the designated index value k differs from the index value determined optimal on the receiver side, i.e., a general state in which an exactly optimal precoding vector is not found in the codebook, can be obtained.

As described above, in the user interface shown in FIG. 6, the 4×2 propagation channels are made to correspond to a singular value decomposition expression in order to designate, as a setting parameter, an index value that the normal test target 1 should report as an optimal precoding vector for each propagation channel. This facilitates parameter setting. Further, since the designated index value can be easily compared with that actually reported by the test target 1, the operation of the test target 1 can be easily confirmed.

In addition, since the shifted phase φ enables setting of a general propagation state in which an exactly optimal precoding vector is not found in the codebook, tests can be executed in a state close to the actual propagation channel environment.

Although in the above embodiment, the test apparatus 20 is configured to apply N test signals to an M×N MIMO test target 1, it may have a function of receiving and decoding signals sent by the test target 1 in response to the test signals, and extracting, from the decoded signals, the index value of the precoding vector reported from the test target 1. In this case, the transmission information generating unit 21 reads, from a codebook, a precoding vector corresponding to the extracted index value, and generates an information signal subjected to precoding based on the read precoding vector. Thus, a test based on the signals processed using the precoding vector designated by the test target 1 can be realized.

Although in the above embodiment, testing of a MIMO system of M=4 and N=2 has been described, the invention is also applicable to other M×N MIMO systems (M>N≥1, e.g., 4×1, 8×2, 8×4, etc.) (though restrictions are imposed on the propagation channels that can be set). In the broad sense, the MIMO scheme includes a case where the terminal side has only one antenna.

Regarding the modulation technique, the embodiment is applicable not only to OFDMA for use in LTE and OFDM for use in wireless LAN, but also to a MIMO scheme using W-CDMA. In the latter case, it is sufficient if a signal processing structure necessary for this modulation technique is employed.

In the above embodiment, N (=2) synthesis signals Sa and Sb are generated by processing the transmission information signals s0 to s3 output from the transmission information generating unit 21, processing the combination selecting unit 22, the phase shifting unit 23 and the additive synthesis unit 24.

The processes of the combination selecting unit 22, the phase shifting unit 23 and the additive synthesis unit 24 are equivalent to a linear process expressed by the multiplication of matrices P and G included in the aforementioned equation (1).

If this linear process is replaced with the following expression, and FIG. 1 and the equation (1) are rewritten, $$[G][P] \equiv [T] = \begin{bmatrix} t_{11} & t_{12} & t_{13} & t_{14} \\ t_{21} & t_{22} & t_{23} & t_{24} \end{bmatrix}$$

the configuration of FIG. 8 and the following equation (14) can be acquired:

$$[R] = [H][T][S] \quad (14)$$

$$= \begin{bmatrix} r_1 \\ r_2 \end{bmatrix}$$

$$= \begin{bmatrix} h_{11} & h_{12} \\ h_{21} & h_{22} \end{bmatrix} \begin{bmatrix} t_{11} & t_{12} & t_{13} & t_{14} \\ t_{21} & t_{22} & t_{23} & t_{24} \end{bmatrix} \begin{bmatrix} s_0 \\ s_1 \\ s_2 \\ s_3 \end{bmatrix}$$

Namely, it can also be explained that the N (=2) synthesis signals Sa and Sb are generated by outputting the transmission information signals s0 to s3 from the transmission information generating unit 21 to the linear transform unit 28, where the signals are subjected to a transform expressed by multiplication by a complex matrix.

In FIG. 8, if t11 to t14 and t21 to t24 in the linear transform unit 28 can be set to arbitrary complex numbers, the same process as in the aforementioned propagation channels (shown in FIG. 1) can be executed, and a further extended process can also be incorporated.

In the aforementioned configuration, propagation channels expressed by an arbitrary complex matrix of N rows and M columns (in the above embodiment, N=2 and M=4) cannot be constructed, and propagation channel parameters can be set only under a certain constraint. In contrast, in the configuration of FIG. 8, propagation channels expressed by an arbitrary complex matrix of N rows and M columns can be constructed.

However, it should be noted that although in the configuration shown in FIG. 1 and expressed by the equation (1), propagation channels expressed by an arbitrary complex matrix of N rows and M columns cannot be constructed, they can be constructed with a smaller number of complex number multipliers than in the configuration given by the equation (14).

A description will be given of the fact that propagation channels expressed by an arbitrary complex matrix of N rows and M columns can be realized by the configuration expressed by the equation (14) and shown in FIG. 8.

Assume here that 4×2 MIMO propagation channels expressed by a complex matrix of two rows and four columns is given by the following propagation channel matrix [F]. In this case, the user of the test apparatus sets a combination of certain complex numbers f11-f14 and f21 to f24 as below in the test apparatus through a user interface, thereby designating the characteristics of propagation channels used for testing.

$$[F] = \begin{bmatrix} f_{11} & f_{12} & f_{13} & f_{14} \\ f_{21} & f_{22} & f_{23} & f_{24} \end{bmatrix}$$

The above matrix [F] is transformed into the following form by subjecting it to singular value decomposition:

$$[F] = \begin{bmatrix} f_{11} & f_{12} & f_{13} & f_{14} \\ f_{21} & f_{22} & f_{23} & f_{24} \end{bmatrix}$$

$$= \begin{bmatrix} u_{11} & u_{12} \\ u_{21} & u_{22} \end{bmatrix} \begin{bmatrix} \lambda_1 & 0 & 0 & 0 \\ 0 & \lambda_2 & 0 & 0 \end{bmatrix} \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}^H$$

where $\lambda_1$ and $\lambda_2$ are real singular values, and the following matrices are unitary matrices including complex numbers as elements:

$$\begin{bmatrix} u_{11} & u_{12} \\ u_{21} & u_{22} \end{bmatrix}$$

and $$\begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}$$

In FIG. 8, the parameter setting unit 27 sets, in the linear transform unit 28, t11 to t14 and t21 to t24 calculated by the following expression:

$$\begin{bmatrix} \lambda_1 & 0 & 0 & 0 \\ 0 & \lambda_2 & 0 & 0 \end{bmatrix} \begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix}^H = \begin{bmatrix} \lambda_1 v_{11}^* & \lambda_1 v_{21}^* & \lambda_1 v_{31}^* & \lambda_1 v_{41}^* \\ \lambda_2 v_{12}^* & \lambda_2 v_{22}^* & \lambda_2 v_{32}^* & \lambda_2 v_{42}^* \end{bmatrix}$$

$$\equiv \begin{bmatrix} t_{11} & t_{12} & t_{13} & t_{14} \\ t_{21} & t_{22} & t_{23} & t_{24} \end{bmatrix}$$

Further, the parameter setting unit 27 sets, in the 2×2 propagation channel processing unit 26, h11 to h22 given by the following expression:

$$\begin{bmatrix} u_{11} & u_{12} \\ u_{21} & u_{22} \end{bmatrix} \equiv \begin{bmatrix} h_{11} & h_{12} \\ h_{21} & h_{22} \end{bmatrix}$$

By virtue of this configuration of FIG. 8, N (=2) signals r1 and r2 equivalent to those obtained when the propagation channel matrix [F] is set in the conventional 4×2 propagation channel processing unit 13 shown in FIG. 9 can be supplied to the test target, which enables the number of signal processing units 25 to be reduced from M (=4) to N (=2).

What is claimed is:

1. A test apparatus for testing a test target that includes a terminal, a circuit board incorporated in the terminal, or an integrated circuit mounted on the circuit board, the terminal utilizing an M×N (M>N) MIMO scheme in which M antennas are provided on a base station side, and N antennas are provided on a terminal side, the test apparatus including a transmission information generating unit configured to output transmission information of M series signals to be sent to the test target, the test apparatus comprising:
   a linear transform unit configured to receive the transmission information of M series signals and designated parameter information, and to transform the received transmission information of M series signals into N synthesis signals by linear transform expressed by multiplication by a matrix of N rows and M columns that includes complex numbers as elements;
   N signal processing units configured to perform, on the N synthesis signals, signal processing corresponding to a modulation technique of the test target;
   an N×N propagation channel processing unit configured to perform N×N pseudo propagation channel processing on N signals output from the N signal processing units, based on designated propagation channel information, and to supply resultant N signals to the test target; and
   a parameter setting unit configured to set information in the linear transform unit and the N×N propagation channel processing unit to acquire desired M×N propagation channel characteristics as synthesis characteristics of the linear transform unit and the N×N propagation channel processing unit.

2. The testing apparatus according to claim 1, wherein the linear transform unit receives designated N×M complex numbers to multiply the transmission information of M series signals by the matrix of N rows and M columns to transform the transmission information of M series signals into N synthesis signals.

3. The testing apparatus according to claim 1, wherein the linear transform unit comprises:
   a combination selecting unit configured to classify the transmission information of M series signals into N groups in accordance with designated combination information;
   a phase shift unit configured to shift a relative phase relationship between the N-classified transmission information signals by rotation on a complex plane in accordance with designated phase information; and
   an additive synthesis unit configured to add signals included in each of the N groups and shifted in phase from each other to form N synthesis signals, and
   the parameter setting unit sets information in the combination selecting unit, the phase shift unit and the N×N propagation channel processing unit to acquire characteristics equivalent to characteristics of M×N propagation channels with which the test target is expected to determine that a desired precoding vector included in a set of precoding vectors defined beforehand for the M×N propagation channels is optimal, if the test target is normal.

4. The testing apparatus according to claim 3, wherein the parameter setting unit designates, as a matrix including a matrix corresponding to the desired precoding vector, a unitary matrix of M rows and M columns obtained as one of the factors in the product of the unitary matrix of M rows and M columns, a diagonal matrix of N rows and M columns and a unitary matrix of N rows and N columns when performing singular value decomposition of a propagation channel matrix of N rows and M columns indicating characteristics of M×N propagation channel model formed by the combination selecting unit, the phase shift unit, the additive synthesis unit and the N×N propagation channel processing unit, whereby appropriate values are set for the combination selecting unit, the phase shift unit and the N×N propagation channel processing unit such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

5. The testing apparatus according to claim 4, wherein when selecting an optimal precoding vector from arbitrary vectors not limited to predefined precoding vectors, the parameter setting unit is configured to shift part of the parameter information from the appropriate values such that the optimal precoding vector is not included in the predefined precoding vectors.

6. A test method for testing a test target that includes a terminal, a circuit board incorporated in the terminal, or an integrated circuit mounted on the circuit board, the terminal utilizing an M×N (M>N) MIMO scheme in which M antennas are provided on a base station side, and N antennas are provided on a terminal side, the test method including a step of outputting transmission information of M series signals to be sent to the test target, the test method comprising steps of:
   transforming the transmission information of M series signals into N synthesis signals by linear transform expressed by multiplication by a matrix of N rows and M columns that includes complex numbers as elements, based on designated parameter information;
   performing, on the N synthesis signals, signal processing corresponding to a modulation technique of the test target;
   performing N×N pseudo propagation channel processing on N signals subjected to the signal processing, based on designated propagation channel information, and supplying resultant N signals to the test target; and
   setting, before the outputting the transmission information of M series signals, information necessary for the linear transform and the N×N pseudo propagation channel processing, to acquire desired M×N propagation channel characteristics as synthesis characteristics for the linear transform unit and the N×N pseudo propagation channel processing.

7. The test method according to claim 6, wherein the step of transforming the transmission information of M series signals includes a step of receiving designated N×M complex numbers to multiply the transmission information of M series signals by a matrix of N rows and M columns to thereby transform the transmission information of M series signals into N synthesis signals.

8. The test method according to claim 6, wherein the step of transforming the transmission information of M series signals includes steps of:
   allocating the transmission information of M series signals into N groups based on designated combination information;

performing a phase shift to change a relative positional relationship between the transmission information signals classified into the N groups, by rotation on a complex plane based on designated phase information; and performing an additive synthesis to add signals included in each of the N groups and changed in phase relationship, to form N synthesis signals, the step of setting the information including a step of setting information for the step of combining the transmission information of M series signals, the step of performing the phase shift, the step of performing the additive synthesis and the step of performing the N×N pseudo propagation channel processing such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

9. The test method according to claim 8, wherein the step of setting the information includes a step of designating, as a matrix including a matrix corresponding to the desired precoding vector, a unitary matrix of M rows and M columns obtained as one of the factors in the product of the unitary matrix of M rows and M columns, a diagonal matrix of N rows and M columns and a unitary matrix of N rows and N columns when performing singular value decomposition of a propagation channel matrix of N rows and M columns indicating characteristics of an M×N propagation channel model which is set by utilizing the step of allocating, the step of performing the phase shift, the step of performing the additive synthesis and the step of performing the N×N pseudo propagation channel processing, whereby appropriate values are set for the step of combining the transmission information of M series signals, the step of performing the phase shift and the step of performing the additive synthesis such that the synthesis propagation characteristics are equivalent to characteristics of the M×N propagation channels with which the test target is expected to determine that the desired precoding vector included in the set of precoding vectors defined beforehand for the M×N propagation channels is optimal, if the test target is normal.

10. The testing method according to claim 9, wherein when an optimal precoding vector is selected from arbitrary vectors not limited to predefined precoding vectors, the step of setting the information includes a step of shifting part of the parameter information from the appropriate values such that the optimal precoding vector is not included in the predefined precoding vectors.

* * * * *